Patented Apr. 4, 1939

2,152,744

UNITED STATES PATENT OFFICE 2,152,744

INSOLUBLE METAL CATIVATES AND METHOD OF MAKING THEM

Nicholas L. Kalman, Cambridge, Mass.

No Drawing. Application December 10, 1936, Serial No. 115,148

18 Claims. (Cl. 260—105)

This invention relates to water-insoluble metal compounds of cativic acid, and to methods of preparing them.

This application is a continuation in part of my copending application, Serial No. 664,551, filed April 5, 1933.

The organic acid used for the preparation of water-insoluble metal compounds thereof, according to this invention, is described in detail, together with methods of preparing it, in my copending application, Serial No. 105,697, filed October 15, 1936, and also in my co-pending application, Serial No. 594,925, filed February 24, 1932, of which Serial No. 105,697 is a continuation in part. In order to make the present disclosure entirely clear, however, I will outline briefly the characteristics of this organic acid and the raw material from which it comes.

The raw material used as a source of this organic acid is the exudate from the species of the tree called *Prioria copaifera*, Gris., which tree is found abundantly in parts of tropical and semi-tropical countries,—for example, along the Caribbean coast of Panama and Costa Rica. The exudate is properly called cativo resin, although it is also commonly called cativa (or cateva or catteva) balsam, and also by various local names. The natural exudate is usually a greenish brown, very tacky and viscous, opaque liquid, and has, especially when heated, an unpleasant odor. Attempts to use it commercially have heretofore been without success.

I have found that about 70 to 80% of this resin exudate is in the form of an organic acid. This acid is not readily secured by ordinary methods of procedure without considerable contamination with other ingredients, and with by-products which result from the methods of treating. To this acid, which I have succeeded in obtaining in a pure state for the first time, I have given the name "Cativic Acid".

Cativo resin consists as a rule of about ½% water, 0.1% ash, up to 2% volatile oil, about ½% of an unidentified acid, which has a very much lower boiling point than cativic acid. The two major constituents of cativo resin are cativic acid, as mentioned above, consisting of about 70 to 80% of the material, and another substance consisting of about 15 to 25% of the material, which substance I have found to be an ester and have named cativyl cativate, as my work indicates that it is an ester product of cativic acid and its corresponding alcohol. This alcohol I have isolated for the first time and have given it the name cativyl alcohol.

Cativic acid is a very viscous and tacky substance; it is a semi-solid having a cold flow, and is colorless or substantially so, and nearly entirely odorless. All attempts at crystallization of this material have so far failed, and as in the case of similar high molecular weight non-crystallized and oxidizable organic acids, it is a very difficult matter to establish a precise chemical formula and absolute physical and chemical characteristics. It appears, however, to be a definite chemical compound, which may exist in one form or as a mixture of isomeric forms all having the same molecular formula, set forth below. Closely related compounds (having, for example, 2 carbon atoms more,—or less) may be present in traces; these would be practically impossible to isolate and identify. This chemical compound, which may or may not be present in isomeric form, I refer to as cativic acid. A series of combustions on samples of purified cativic acid give a mean of carbon 78.41%, and hydrogen 11.06%. This corresponds to a molecular formula of $C_{20}H_{34}O_2$. It will be readily apparent that the exact molecular formula of a substance having such a high molecular weight is not easy to determine. Hence this formula is advanced as being the most probable as far as I have been able to ascertain. The mean acid number is found to be 183.3. Cativic acid has an unsaturated bond, but the iodine number determinations according to Wij's method yield varying data according to the amount of sample taken, time of reaction, etc. Representative samples of purified cativic acid show an average refractive index of 1.509 at 24° C.; a specific gravity of 0.9987 at 23° C.; a viscosity, 100 cc. pipette at 22° C., of 78.5 hours; water under same conditions, 11.6 seconds.

Cativic acid exhibits the properties of a mono basic acid, readily forming salts. It also readily forms esters, differing from abietic and other resin acids which esterify only with difficulty. Its composition in conjunction with the degree of unsaturation clearly differentiates it from the aliphatic acids. With a body of as high molecular magnitude as cativic acid, a small variation in percentage composition of hydrogen, oxygen, and carbon produces a corresponding greater apparent variation in composition, but from my researches, there is no compound of this composition or closely approaching the same which has the characteristics indicated above and the ability of ready esterification.

Cativic acid is insoluble in water, but soluble in all the common organic solvents including generally aliphatic or aromatic hydrocarbons, alcohols, ketones, esters, ethers, chlorinated solvents, etc.

Complete details of various methods for preparing cativic acid are given in my application, Serial No. 105,697, referred to above. Of these various methods, I will describe herein the distillation process, which will be sufficient to show a convenient manner of obtaining cativic acid. For the other processes of obtaining this acid, reference may be had to my said co-pending application.

In carrying out the distillation process, I may first filter the cativo resin (which is advantageously warmed or dissolved in a suitable solvent, to improve its flow) in order to remove dirt and other foreign matter. This step, however, is not necessary. Then I subject it to heat and preferably to a slight vacuum, equal, say, to a pressure of 200 mm. of mercury, thereby driving off water and other low-boiling constituents. The pressure during this step may vary considerably. The remaining constituents—cativic acid and cativyl cativates—do not distill while the temperature is below about 200° C., even at a low absolute pressure. (Pressures, in this specification, are given in millimeters of mercury, and are absolute pressures.) The receiver is now changed, and on raising the temperature to above 200° C., with a low pressure (below 10 mm. preferably), cativic acid is distilled off, leaving cativyl cativate as the residue. Cativic acid boils at about 228° C. at 6 mm. pressure. Care should be taken, during the distillation, to keep the pressure low; with higher pressures (e. g. 10 mm. or over) there is a tendency for cativic acid to lose $CO_2$, forming the corresponding hydrocarbon which I call cativene.

However, once the distillation of cativic acid is well under way, at the indicated low pressure, there is little or no further trouble from cativene formation, and any cativene which came over in the distillation may be separated by simultaneous or subsequent fractional distillation or by neutralization of the cativic acid, or by other suitable means. As cativyl cativate does not distill or decompose under the conditions mentioned above, there is a sharp break in the distillation when cativic acid has been distilled over, the cativyl cativate remaining behind as a residue. When separating by neutralization, an alkali such as caustic soda together with a suitable solvent such as water is used, and the cativic acid separated from the other materials including cativene, in the same general way as outlined below under the neutralization process. There is also some tendency for cativic acid and its derivatives to oxidize especially at elevated temperatures, where progressive discoloration also takes place. This can be avoided by distilling in the absence of oxygen,—e. g. in an atmosphere of nitrogen or carbon dioxide, etc.

In this disclosure I refer to metals of group IB (i. e., copper, silver, gold) and of the second to eighth groups, inclusive, of the periodic system, as being those used in preparing the water-insoluble metal cativates of the present invention. In other words, I exclude herefrom the group of metals (namely group IA of the periodic system) which form water-soluble salts with cativic acid,—lithium, sodium, potassium, rubidium and caesium, and also ammonium, which is often considered as a member of this group and may be considered as such for the present purposes. Since the alkali metals form water-soluble salts with cativic acid whereas all the other metals form water-insoluble salts with cativic acid, the methods of making said water-soluble salts may be modified accordingly from the methods hereinafter set forth. The methods described below apply to all the metals in the group above referred to,—i. e. all those outside of group IA of the periodic system, as will be clear from the numerous examples given by way of illustration.

Broadly stated, the method of making water-insoluble metal cativates is as follows: Cativic acid or an alkali cativate (e. g. sodium cativate), alone or in combination with other substances, is reacted with a suitable compound of the desired metal, whereby the corresponding water-insoluble metal cativate is produced.

Thus, it is possible to start with the original cativo resin, or with more or less purified forms thereof, or with the pure or relatively pure cativic acid obtained from cativo,—or with the sodium or other alkali metal salt of the cativic acid (and possibly of the cativate radical of any cativyl cativate) present. For example, cativo, with or without any previous purification, is dissolved in a suitable solvent such as petroleum ether or Varnolene. Varnolene is the trade name of a petroleum hydrocarbon, boiling at about 150° C. This dissolving step, while not absolutely necessary, is desirable, as cativo alone, especially when cold, is too viscous to permit of easy manipulation in the following steps. The solution of cativo is then mixed with an aqueous solution of alkali, e. g. NaOH, whereupon alkali cativate forms by reaction between the alkali and the cativic acid present, and the mixture becomes two-phase. One phase is a solution of cativyl cativate in the solvent used; the other is sodium cativate in water. These phases may be readily separated, and washed and purified as desired. If the solution of alkali is in sufficient quantity and concentration, and preferably if some heat is applied, the alkali will react with the cativyl cativate as well as with the cativic acid, and by double decomposition produce sodium cativate and cativyl alcohol. The resulting mixture becomes two-phase, as above, except that cativyl alcohol replaces cativyl cativate,—wholly or in part, as desired. The sodium cativate produced by these procedures may be separated out and used as such as a starting material for making water-insoluble metal cativates, or the two-phase mixtures may be used for this purpose, especially if it is desired to have as a final product a mixture of water-insoluble metal cativate with cativyl cativate, cativyl alcohol, or both.

In the above procedure, an excess of alkali has a tendency to salt out the alkali cativate formed, and furthermore free alkali in the alkali-cativate solution results in precipitating the corresponding metal hydroxide when the solution of the metal salt is added, thus resulting in a corresponding loss of the metal salt and in a contamination of the water-insoluble metal cativate. Therefore, it is advantageous (but not absolutely necessary) to refrain from using an excess of alkali over that necessary to neutralize the cativic acid and to react with any cativyl cativate present. On the other hand, less than the requisite amount of alkali for neutralization of the cativic acid will result, if not properly eliminated, in an admixture of cativic acid in the water-insoluble metal cativate, such an admixture being deleterious for certain purposes, for instance by making the water-insoluble metal cativate films tacky and soft. Of course, for certain other purposes, such an admixture of cativic acid will be advantageous and desirable, and in those cases the neutralization of cativic acid and the working-up of the water-insoluble metal cativate should be so modified as to obtain a final product containing the desired amount of cativic acid.

It is, of course, possible to take cativic acid instead of cativo resin, and react it with an alkali such as sodium or potassium hydroxide, thereby producing sodium or potassium (or other alkali) cativate, for use in procedures described below.

In carrying out my process, I may take sodium or other water-soluble alkali cativate, prepared by any of the procedures described above, and react the same, in water solution, with a water-soluble compound of the desired metal of groups IB to VIII inclusive.

Alkali cativates have rather low solubilities in cold water, but the solubilities of these salts greatly increase when warm or hot water is used. This procedure is advantageous when, for example, large dilutions should be avoided for operating reasons, etc. The water-insoluble metal cativates, as a rule, precipitate out in a more filterable form from warm solutions, the most efficacious temperature varying with cations used and the concentrations of solutions.

Under certain circumstances,—as, for example, when the metal compound decomposes or hydrolyzes in the presence of water,—the alkali cativate and the metal compound may be reacted in some other solvent medium in which both are soluble, but in which the resulting water-insoluble metal cativate is preferably (though not necessarily) insoluble. Ethyl alcohol is an example of a material which is a solvent for sodium cativate and also for certain metallic salts, —e. g. ferric chloride, magnesium acetate, etc.

As alcohol is a much better solvent for alkali cativates than water is, alcohol or aqueous alcoholic mixtures of varying concentrations may be used, if so desired, as solvents for the alkali cativates. But, when doing so, it should be kept in mind that, when adding the metal salt solution used as a precipitant, the combined solutions should have such an alcohol concentration as not to precipitate the metal salt before reacting. I may also proceed by dissolving cativo in alcohol, and, with or without filtration, convert the cativic acid into alkali cativate, by neutralization with an aqueous, alcoholic or aqueous-alcoholic alkali solution, or by bubbling ammonia gas into the alcoholic solution until the desired end is attained. Cativyl cativate is soluble in the alcoholic solution of cativo, due to the solvent action of cativic acid therein, but is insoluble in alcohol or aqueous alcohol, and may be eliminated with a solvent immiscible with alcohol or aqueous alcohol, such as Varnolene or petroleum ether.

The following examples will illustrate my process, as applied to the preparation of a wide range of water-insoluble metal cativates, and the use of many different compounds of metals of groups IB to VIII inclusive as starting materials.

*Copper cativate.*—To an aqueous solution of sodium cativate is added an equimolecular amount of an aqueous solution of copper sulfate, with stirring. A flocculent greenish precipitate is formed, which may be separated from the liquid by mechanical means such as filtering, centrifuging, etc. The liquid contains sodium sulfate resulting from the reaction, and also any unreacted original materials, although the latter are ordinarily practically absent if equimolecular portions of reactants are used, as the reaction is substantially complete. After the procedure described above, the copper cativate may be washed and dried; it reduces upon grinding to a dry powder of greenish-blue color characteristic of the cupric ion. The washing may be done with water, or with any liquid which is a non-solvent of the metal cativate and a solvent for the other materials remaining. Successive washings may employ different liquids.

Instead of drying the water-insoluble metal cativate may be dissolved in a suitable solvent, toluene for instance, such solvent solution subsequently being washed with water if desired, the solvent layer, after having been separated from the aqueous layer, desiccated, if so desired (for removal of any water present) and used as such. Alternatively, the solvent may be evaporated, and the dry water-insoluble metal cativate obtained in this manner. Or, the water-insoluble metal cativate may be precipitated from its solution by a nonsolvent of said cativate, such as acetone or ethyl alcohol.

The preceding example indicates the procedure sufficiently well so that repetition with other salts of metals of groups IB to VIII inclusive is unnecessary. A few will, however, be mentioned merely, showing in order: the cativate salt produced; the metal compound used in preparing it; the nature of the washed, dried, and ground product.

*Calcium cativate.*—Use calcium chloride. Product is a white powder.

*Zinc cativate.*—Use zinc acetate,

Product is a white powder.

*Mercury cativate.*—Use mercuric acetate. Product is a white powder, or may have gray color.

*Aluminum cativate.*—Use aluminum sulfate, $Al_2(SO_4)_3 \cdot 18H_2O$. Product is a white powder.

*Lead cativate.*—Use lead acetate. Product is a white or yellowish-white powder.

*Chromium cativate.*—Use chromium sulfate. Product is a grayish-green powder.

*Manganese cativate.*—Use manganese sulfate. Product is a pink powder.

*Iron cativate.*—Use ferric chloride. Product is a brown powder.

*Cobalt cativate.*—Use cobalt chloride. Product is a greenish-gray powder.

All these several examples have been selected to show the wide variety of metal compounds used and also to show the general applicability of the process to metals of groups IB to VIII, inclusive, of the periodic system. It will be noted that the products are all white, or substantially so, except as the metal ion may lend its characteristic color. Each product is odorless, or has a faint, agreeable, resinous odor which appears to be associated with the organic radical (cativate radical) present.

Various alternative methods may be used for preparing the water-insoluble metal cativates. For example, cativic acid, or suitable material containing it, may be heated or fused directly with an oxide of the desired metal, or with a compound of such metal with a volatile radical,— e. g. the hydroxide, carbonate, acetate, etc., of the metal,—that is to say, volatile at the temperature used in the fusion, which should of course be below the temperature at which the cativate radical decomposes. This method is generally not as advantageous as the procedures described previously herein, however, due to the difficulty of thorough mixing of the reactants and the fact that more or less residual unreacted material is apt to be present. Where this is not objectionable, however, the method is satisfactory.

This difficulty of mixing may be overcome by dissolving the cativic acid, or other appropriate material containing it, in a suitable high-boiling solvent or solvents, and adding a salt or oxide or hydroxide of the desired metal of groups IB to VIII, inclusive, preferably in finely-divided form and with stirring, to the solution. The reaction takes place, as a rule, at about 120–150° C., with the simultaneous formation and boiling-off of water, etc. When elevated temperatures are used in the preparation of these water-insoluble-metal cativates, it is advantageous, to avoid discoloration and possible oxidation, to work in a non-oxidizing atmosphere. The metal compound may be soluble in the solvent (as already discussed herein), or not.

The water-insoluble metal cativates, are soluble in various organic solvents. Thus, carbon tetrachloride is an excellent solvent for all those cativates listed in the above examples,—except mercury cativate,—although with aluminum cativate the action is gelatinization rather than solution. Aromatic hydrocarbons of the type of benzene and toluene are also good solvents, both in the cold and when heated, for the water-insoluble metal cativates. Varnolene and turpentine are also good solvents for water-insoluble metal cativates. Linseed oil and China-wood oil do not act as solvents when cold, but when heated they are solvents for water-insoluble metal cativates, such cativates remaining in solution after subsequent cooling. Ethyl alcohol and acetone, on the other hand, are ineffective as solvents for water-insoluble metal cativates.

These solvent relationships may be used to advantage in purifying the water-insoluble metal cativates,—for instance, in connection with their preparation as above described. Thus, carbon tetrachloride or benzene may be mixed with the reaction mixture, and the two phases of the resulting liquid separated. One of these phases will be an aqueous solution of the salt of an alkali metal; the other will be a carbon tetrachloride solution of the water-insoluble metal cativate. The latter may be used in that form, or the solvent may be evaporated, or the water-insoluble metal cativate precipitated from the solution by addition of a non-solvent, such as acetone or ethyl alcohol.

It will be noted that, as pointed out more specifically in the examples, the water-insoluble metal cativate is prepared either directly from cativic acid (or a material such as cativo which contains cativic acid), or from an alkali cativate. The latter is prepared from cativic acid in the first instance. In either case, the original material (cativic acid or alkali cativate) is a compound having the cativate radical (which is monovalent) in combination with a monovalent radical,—e. g., hydrogen cativate, sodium cativate, ammonium cativate, potassium cativate, etc., and this compound is soluble in ethyl alcohol. The ethyl alcohol may be pure, or may be diluted somewhat with water. High dilutions are to be avoided, however; about 75% or more ethyl alcohol and 25% or less water is a good solvent mixture. The water-insoluble metal cativates, on the other hand, are insoluble in ethyl alcohol and/or do not have the combination of the cativate radical with a monovalent radical.

Water-insoluble metal cativates are useful generally for a number of purposes, some of which will now be indicated.

Water-insoluble metal cativates may be used in the preparation of lacquers, to give improved body and adhesion, and also, in the case of the colored metal cativates, to give coloration as well. They are stable and give no objectionable odor to the products. As already indicated, water-insoluble metal cativates are soluble in the usual lacquer thinners (e. g., turpentine and Varnolene), and thus may be readily mixed with the lacquer ingredients. In the same general manner, water-insoluble metal cativates may be used as ingredients of paints; they may, for example, be dissolved in China-wood or linseed oil, under the influence of heat to promote solution, and then incorporated with the other paint ingredients; or they may be dissolved in thinners, and added cold to the other ingredients. Water-insoluble metal cativates, when used as ingredients in paints and lacquers, improve waterproofness, and also have no noticeable effect on the relative transparency or opacity of the product.

Water-insoluble metal cativates are thermoplastic; they may be incorporated as addition or modifying agents with resins, fillers, and other ingredients customarily used in the molding and plastics art. It should be noted, in this connection, that they are most satisfactory in such procedures when the temperatures of preparation and manufacture are not too high, as excessively high temperatures tend to discolor the cativate compounds.

I have also found that water-insoluble metal cativates are compatible with nitrocellulose, and may be used in the preparation of nitrocellulose films, sheets etc. For example: dissolve a metal cativate, e. g., ferric cativate, in ethyl acetate, add this solution to a nitrocellulose dope, and then sheet out the resulting material, or utilize it in various other ways known in the cellulose derivatives art. Alternatively, the water-insoluble metal cativate or cativates may be added directly to the dope without prior solution, but in such precedure suitable provision should be made when compounding the dope to allow sufficient solvent to take up the added cativate. The presence of water-insoluble metal cativates in the cellulose composition has a thinning effect; hence a larger proportion of solids is permissible in cellulose dopes containing water-insoluble metal cativates, without raising the viscosity above that of similar dopes without the cativates. The fact that certain of the water-insoluble metal cativates (iron, cobalt, etc.) are characteristically colored makes them further suitable for making colored effects in transparent wrappings of nitrocellulose and of various other cellulose derivatives.

Illustrative of another use for water-insoluble metal cativates as a group is that in waterproofing. They may thus be employed for waterproofing textiles, paper, and the like. For example, the water-insoluble metal cativate or cativates may be dissolved in a suitable solvent, alone or with suitable plasticizers, and cloth or paper then treated with the resulting solution by any well known method. A generally preferable procedure, whereby the expense of solvents is elminated, is to impregnate the cloth or paper with a water solution of a soluble compound of cativic acid,—e. g. sodium cativate,—following which the cloth or paper is treated with a water solution of a soluble salt of the desired metal. These two water-soluble compounds react in situ, forming the water-insoluble metal cativate on and/or in the cloth or paper.

The water-insoluble metal cativates may also be used as thickening agents for lubricants, with which they are mixed in such proportions as to give the desired consistency.

In addition to these uses for water-insoluble metal cativates generally, there are further special uses for which one or a few of these cativates are particularly suitable.

For example, cativates of the commoner elements of the eighth group of the periodic system,—iron, cobalt, and nickel,—are useful as coloring agents, in various connections such as those suggested above and in others.

The waterproofing characteristics of water-insoluble metal cativates in general have already been pointed out above. I find that aluminum cativate is particularly useful in this connection,— even more so than the other heavy metal cativates generally, although all are good.

Certain water-insoluble metal cativates find use where a salt of the particular metal is advantageous per se,—e. g., copper cativate may be used as an ingredient of anti-fouling paints, not only because it is a suitable paint constituent (as are water-insoluble metal cativates generally, as already pointed out) but also because of the presence of copper in the molecule.

Several water-insoluble metal cativates of the second group of the periodic system have already been mentioned, e. g., mercury, zinc, and calcium cativates. These find various uses,—for example, the mercury cativate is suitable for certain purposes wherein organic mercury compounds are desired; the alkaline earth cativates may be used in various connections of which the following is an example:

Calcium cativate, when mixed with a suitable modifier, such as a water-insoluble alcohol (oleic, for instance) has properties of coherence and extendibility which make it suitable as a chewing gum base or for like purposes. The same is true of magnesium cativate. These two heavy metal cativates of the alkaline earth group are more suitable than many of the other cativates mentioned herein, such as the copper, mercury, lead, etc. cativates, in that they are non-poisonous and may be chewed or otherwise consumed without danger to the human system.

While I have shown and described this invention with reference to a number of examples of the preparation and uses of water-insoluble metal cativates, it is to be understood that this disclosure is for the purpose of illustration only, and that various changes and modifications may be made without departing from the spirit and scope of the invention as set forth in the appended claims.

I claim:
1. A cativate of a metal of groups IB to VIII, inclusive, of the periodic system.
2. Process of preparing a water-insoluble metal cativate, which comprises reacting a compound of a metal of groups IB to VIII, inclusive, with a compound having the cativate radical in combination with a monovalent radical, said latter compound being soluble in ethyl alcohol.
3. Process for preparing a water-insoluble metal cativate, which comprises reacting a cativate selected from the group consisting of hydrogen cativate, ammonium cativate, and alkali metal cativates, with a compound of a metal of groups IB to VIII, inclusive.
4. Process for preparing a water-insoluble metal cativate, which comprises reacting a water-soluble compound of a metal of groups IB to VIII, inclusive, with an alkali-metal cativate.
5. Process for preparing a water-insoluble metal cativate, which comprises reacting a compound of a metal of groups IB to VIII, inclusive, with cativic acid.
6. Process for preparing a water-insoluble metal cativate, which comprises reacting a water-soluble compound of a metal of groups IB to VIII, inclusive, with sodium cativate.
7. Process for preparing a water-insoluble metal cativate, which comprises reacting an alkali cativate with a water-soluble compound of a metal of groups IB to VIII, inclusive, said alkali cativate being produced by reacting an alkali with cativic acid.
8. Process for preparing a water-insoluble metal cativate, which comprises reacting an alkali cativate with a water-soluble compound of a metal of groups IB to VIII, inclusive, said alkali cativate being produced by reacting cativo resin with an alkali to form an alkali cativate.
9. Process for preparing a water-insoluble metal cativate, which comprises reacting, in the presence of a solvent in which it is dissolved, cativic acid, and a compound of a metal of groups IB to VIII, inclusive, whereby to form the corresponding metal cativate.
10. Process for preparing a water-insoluble metal cativate, which comprises heating cativic acid with a compound of a metal of groups IB to VIII, inclusive, said compound being of the group consisting of oxides and volatile-radical compounds of said metal, and reacting to effect the formation of the corresponding water-insoluble metal cativate with simultaneous volatilization of the compound formed by reaction between the anion of the metal compound and the hydrogen of the cativic acid.
11. Process for preparing a water-insoluble metal cativate, which comprises putting sodium cativate into solution, mixing therewith a solution of a water-soluble compound of the desired metal of groups IB to VIII, inclusive, whereby to effect the formation of the corresponding water-insoluble metal cativate, and separating said cativate from the other materials.
12. Process for preparing a water-insoluble metal cativate, which comprises reacting a mixture of cativic acid and cativyl cativate with an alkali whereby to neutralize at least the greater part of the cativic acid, and then treating the resulting mixture with a water-soluble compound of a metal of groups IB to VIII, inclusive, whereby the alkali cativate present will react with said metal compound to form the corresponding water-insoluble metal cativate.
13. A cativate of a metal of the second group of the periodic system.
14. An alkaline earth metal cativate.
15. Calcium cativate.
16. Aluminum cativate.
17. A cativate of a metal of the eighth group of the periodic system.
18. Iron cativate.

NICHOLAS L. KALMAN.